Sept. 11, 1962    M. R. GADDIS ETAL    3,054,037
DYNAMIC BRAKE
Filed April 14, 1961
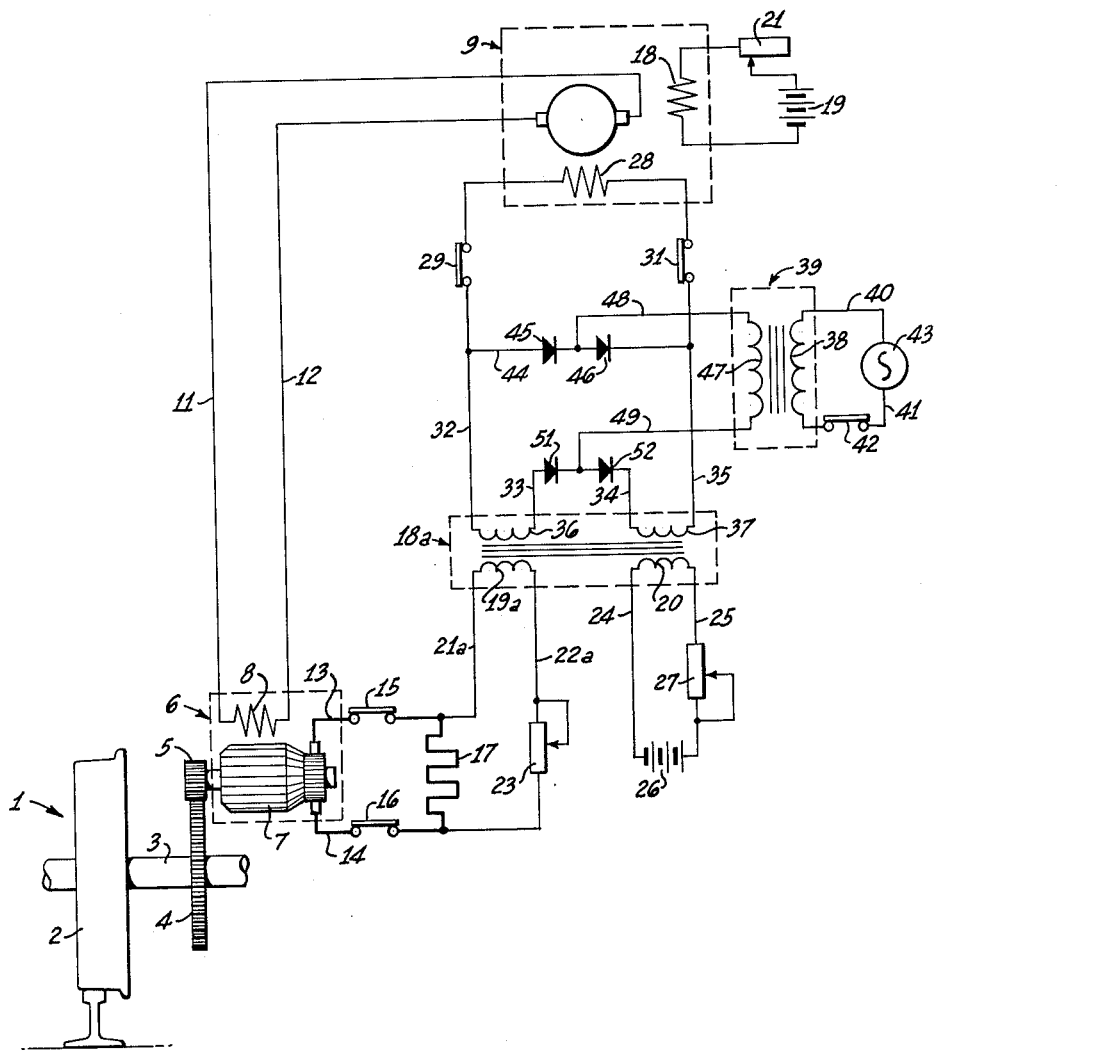
INVENTORS:
MALCOLM R. GADDIS
IRVING L. BAUMANN
BY
ATTORNEYS 3,054,037
DYNAMIC BRAKE
Malcolm R. Gaddis, Santa Clara, Calif. (6801 Paola, Bakersfield, Calif.), and Irving L. Baumann, 3151 Northview Drive, Sacramento 33, Calif.
Filed Apr. 14, 1961, Ser. No. 125,599
1 Claim. (Cl. 318—367)

This invention relates to and in general has for its object the provision of a dynamic brake for motor-driven locomotives, and which can be used to augment the train air brakes.

In braking systems of this kind the series wound electric traction motor used for driving the drive wheels of a locomotive can be made to function as a generator when it is desired to brake the locomotive. The work so done on the motor is dissipated by passing the current generated through a load in the form of one or more resistor grids. The heat in the grids must then be dissipated by forcing air through them. However, due to a limitation of size of the locomotive, there is a limitation on the number and size of the grids which can be used for this purpose. This then means that to prevent the grids from burning out, the current passing through them must be limited.

The Dilworth Patent 2,591,791 of April 8, 1952, discloses a dynamic braking system of the character above disclosed wherein the grids referred to are shunted across the armature of the traction motor and wherein means is provided for limiting the current passing through the grids.

More specifically, the object of this invention is the provision of an improved system for limiting the current passing through the grids of a dynamic locomotive brake and which requires no moving parts in addition to the traction motor, the main generator of the locomotive, and the locomotive alternator.

A further object of this invention is the provision of a system of the character above described wherein the field coil of the traction motor is connected across the main shunt-wound locomotive generator when the system is in its braking condition, and wherein means is provided for regulating the current delivered to this field coil without the use of moving mechanical elements.

Another object of this invention is the provision of a control system of the character above described wherein the shunt field winding of the main generator is connected across the output windings of a reactor through a series of rectifiers, wherein the reactor is provided with a control winding connected across one of the resistor grids, and wherein the reactor is also provided with a bias winding.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claim may be embodied in other forms.

Referring to the drawings:

The single FIGURE of these drawings diagrammatically illustrates a braking system embodying the objects of our invention.

More specifically, this system is incorporated in the traction motor circuit of a diesel engine generally designated by the reference numeral 1. Included in the diesel engine 1 are traction wheels 2 mounted on a shaft 3, and arranged to be driven through gears 4 and 5 by a series-wound traction motor generally designated by the reference numeral 6. Included in the traction motor 6 is an armature 7 and field windings 8. Connecting the windings 8 with the collector ring terminals of a main shunt-wound generator 9 are leads 11 and 12. Connected in closed circuit with the traction motor armature 7, through leads 13 and 14 and switches 15 and 16, are one or more resistance grids 17.

Included in the main generator 9 is a control field winding 18 energized by a battery 19 through a variable resistor 21 under the control of the locomotive engineer.

When in the structure so far described the traction motor 6 functions as a motor, it serves to drive the diesel traction wheels 2 in the usual manner. If, however, the kinetic energy of the diesel is allowed to drive the traction motor 6, the motor then functions as a generator and generates a current through resistance grids or load 17. However, to prevent the grids 17 from burning out, means must be provided for limiting the current passing therethrough, and it is to this means that this invention is particularly directed.

To this end we provide a saturated core reactor generally designated by the reference numeral 18a, including a control winding 19a shunted across one of the grids 17 through lines 21a and 22a through a variable resistor 23. As a result of this construction, the coil 19a senses the current passing through the grids 17.

Also included in the reactor is a bias winding 20 in closed circuit through lines 24 and 25 with a source of direct current such as a battery 26 and a variable resistor 27. The winding 20 is wound in a direction opposite to the direction in which the winding 19a is wound so that the fluxes generated by the two windings oppose each other. The bias winding 20 may also be referred to as a reference winding for imposing a reference voltage on the reactor.

Included in the main generator 9 is a shunt field winding 28 in closed circuit through switches 29 and 31 and lines 32, 33, 34 and 35, with the output windings 36 and 37 of the reactor 18a.

Connected to the primary winding 38 of a transformer 39 through lines 40 and 41 and a switch 42 is an alternator 43 powered by the diesel engine 1. Shunted across the lines 32 and 35 is a line 44, and included in this line are a pair of rectifiers 45 and 46. Connecting one side of the secondary winding 47 of the transformer 38 with the line 44 at a point intermediate the rectifiers 45 and 46 is a line 48. The other or step-up side of the secondary transformer winding 47 is connected through a line 49 with the junction of the lines 33 and 34. Connected in the line 33 adjacent its junction with the line 49 is a rectifier 51, and similarly connected in the line 34 is a rectifier 52.

When the traction motor 6 is being used to drive the diesel engine 1, the switches 15 and 16 or other suitably arranged switches connect the traction motor field windings 8 in series with the armature 7, and the switches 29 and 31 or other suitably arranged switches connect the main generator shunt field winding across the armature of the generator. These switches, as indicated, also serve to disconnect the control system above described from the traction motor and from the main generator. All this, as well as the variable resistor 21, is under the direct control of the locomotive engineer.

When it is desired to use the traction motor 6 as a brake, the system is connected as indicated in the drawings. Current from the armature of the traction motor 6 serves to energize the reactor control winding 19a, and current from the battery 26 serves to energize the bias windings 20 of the reactor. Here note that the windings 19a and 20 oppose each other, and that therefore the fields produced thereby perforce oppose each other. So long as the flux resulting from the winding 19a does not overbalance the flux resulting from the coil 20, only a small amount of rectified current will pass through the generator shunt field windings 28, for under these conditions the reactor 18a operates as a choke. Under these conditions, then, the shunt field windings 28 will produce little or no opposition to the control field winding 18 and the system will retain its status quo.

When, however, the current passing through the control winding 19a is sufficiently great to generate a flux more than sufficient to overcome the flux produced by the bias windings 20, the reactor will "fire" and rectified current will alternately pass through the output windings 36 and 37 and through the shunt field windings 28. The field so produced by the windings 28 opposes the shunt field. As a permissible maximum current passes through the grids 17, the main generator field current is increased negatively such as to oppose the action of the generator battery field. This in turn diminishes the output of the generator and consequently the field produced by the traction motor field coil 8. The output of the traction motor (now operating as a generator) is diminished and the current passing through the resistor grids 17 is correspondingly reduced. This also serves to decrease the current passing through the control winding 19a, thereby to bring the reactor to a point below its firing point. By properly selecting the characteristics of the elements of this system the current passing through the grid or bank of grids 17 can be maintained at a predetermined level below the rated capacity of the grids. Normally the capacity of the traction motor is considerably greater than the capacity of the grids, and consequently there is no danger of overloading and burning out the traction motor.

The field windings 18 are under the control of the locomotive engineer, and if by chance he inadvertently overenergizes the windings 18 the system above described will automatically compensate for this. This results from the fact that although the output of the main generator will be correspondingly increased and likewise the output of the traction motor, the additional current passing through the control winding 19a will again fire the reactor. This, as previously explained, will increase the field produced by the shunt winding 28, and this field will oppose the increased field of the control field winding 18.

In passing, it should be noted that the batteries 19 and 26 are normally used only for initially energizing their associated coils, and that as soon as the main generator has been brought into operating condition, current for energizing the field winding 18 and the bias winding 20 is derived from the generator output, this of course being standard practice in connection with equipment of this kind.

The traction motor, main generator and alternator are standard equipment on diesel locomotives and these elements, together with grids shunted across the armature of the traction motor, together with a conrol circuit, are utilized in the system disclosed in the Dilworth Patent 2,591,791. However, Dilworth's control system is dependent on mechanical elements such as an engine-driven governor, a hydraulic valve system, and a vane motor for adjusting the field rheostat, which in turn modulates the traction motor field winding. In our system all such mechanical elements have been eliminated.

We claim:

A locomotive dynamic braking system comprising: an electric traction motor having an armature for driving and for being driven by the locomotive, and a field winding; a braking resistor connected directly across said motor armature; a generator connected to said motor field winding and having a shunt field winding and a control field winding; a reactor having ouput windings connected across said shunt field winding and separated by a first pair of rectifiers; a second pair of rectifiers connected across said shunt field winding; a transformer having a secondary winding connected between said first pair of rectifiers and between said second set of rectifiers; a direct current control winding included in said reactor and connected across said braking resistor; and a direct current bias winding included in said reactor in opposition to said control winding.

No references cited.